UNITED STATES PATENT OFFICE.

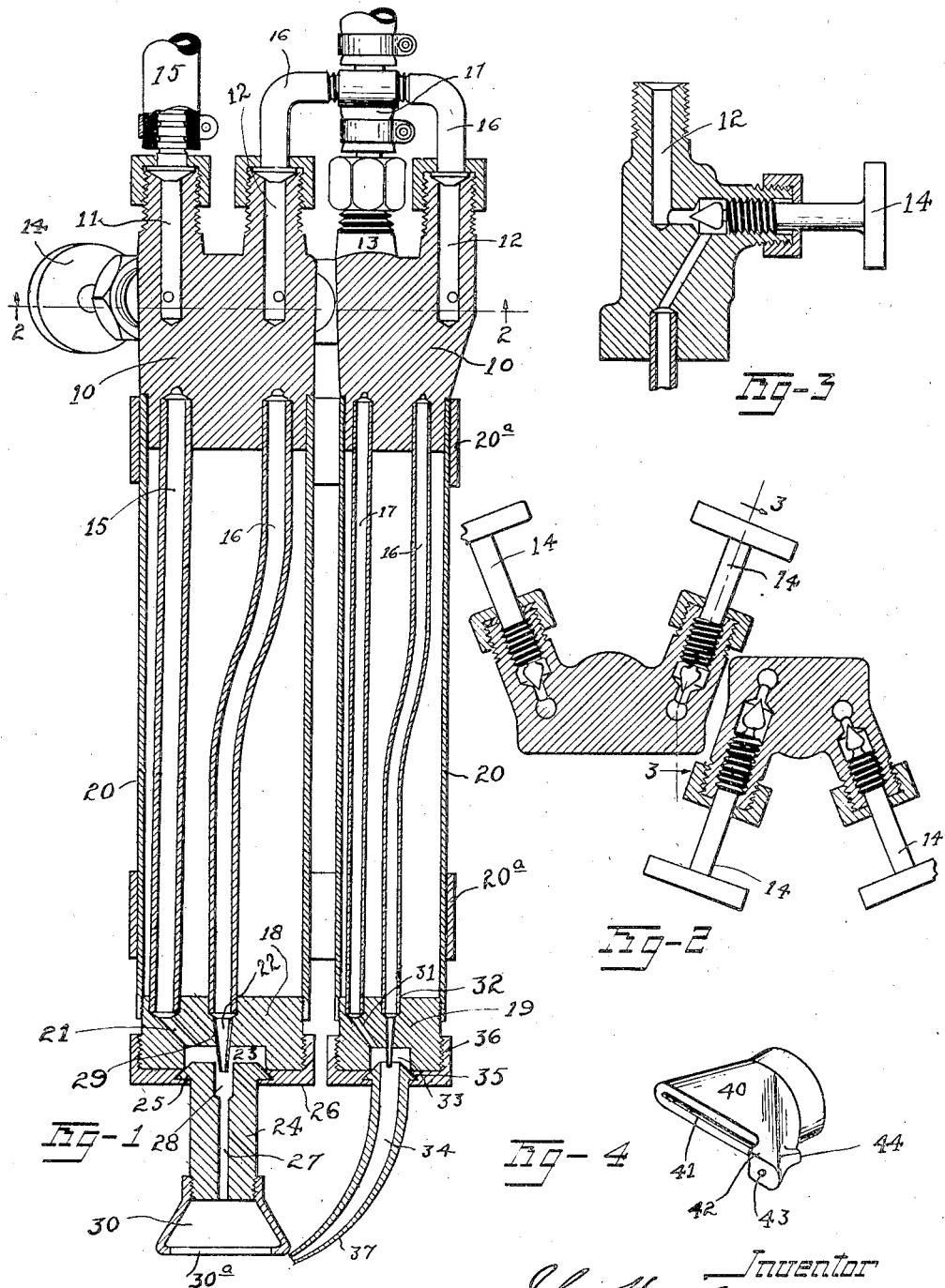

JOHN HARRIS, OF LAKEWOOD, OHIO, ASSIGNOR OF ONE-HALF TO JAMES R. ROSE, OF EDGEWORTH, PENNSYLVANIA.

BLOWPIPE FOR WELDING-MACHINES.

1,359,504.  Specification of Letters Patent.  Patented Nov. 23, 1920.

Application filed September 1, 1917. Serial No. 189,242.

*To all whom it may concern:*

Be it known that I, JOHN HARRIS, a citizen of the United States, residing at Lakewood, in the county of Cuyahoga and State of Ohio, have invented a certain new and useful Improvement in Blowpipes for Welding-Machines, of which the following is a full, clear, and exact description, reference being had to the accompanying drawings.

This invention relates generally to blow pipes for welding machines and has for its object the elimination of certain objections to the blow pipes now employed in connection with welding machines.

First of all the tips of the present types of blow pipes are provided with a series of independent jet openings through which the preheating gas emerges producing a series of separate independent flames spaced apart a sufficient distance to permit the influx of air therebetween and this influx of air, containing as it does so large a proportion of nitrogen gas, retards the preheating and welding operations. One portion of my invention, therefore, comprehends the improvement in the construction of a tip whereby this objectionable feature is avoided. Furthermore in all welding blow pipes of which I am aware it has been customary to commingle acetylene gas with oxygen for the purpose of producing the preheating and welding flames. In a large number of plants in which oxygen is thus employed an electrolytic device or apparatus is employed for the purpose of splitting up water into hydrogen and oxygen in order to obtain the oxygen and the hydrogen thus liberated has ordinarily been discarded.

The object of my invention, therefore, is to utilize this hydrogen thus generated during the electrolytic process thereby economizing in the use of gas and dispensing with the use of acetylene in producing the preheating mixture, keeping the acetylene gas for use in combination with oxygen to produce the welding flame. In this manner I economize with the use of gases inasmuch as I provide a pipe capable of using a gas which has heretofore been discarded. With these and other objects in view the invention consists in the details of construction and novelties of combination hereinafter fully described and set forth in the appended claims.

In the drawings forming a part of this specification I have shown one form of blow pipe constructed in accordance with my invention but it will be understood that other pipes may be employed within the scope of the appended claims, and in these drawings Figure 1 is a vertical sectional view of the blow pipe; Fig. 2 is a horizontal sectional view on the line 2—2 of Fig. 1; Fig. 3 is a sectional view on the line 3—3 of Fig. 2; and Fig. 4 shows a slightly modified form of tip.

In constructing a blow pipe of the type illustrated in the drawings I employ a valve casing 10 consisting of two portions which may be cast integral or rigidly connected together in any suitable manner and these round castings or casings are provided with a gas passage or bore 11 for hydrogen or any other combustible gas, and passages 12 for oxygen and a passage 13 for acetylene. These passages are controlled by means of valves 14. Gas supply pipes lead into these passages and leading therefrom are the tubes 15, 16 and 17, the tube 15 being intended to convey hydrogen or other combustible gas which passes through the bore or passage 11 and the tubes 16 convey oxygen passing through the bores or passages 12, while the tube 17 conveys acetylene passing through the bore or passage 13. As previously stated the valve castings or casings 10 are in two sections and the tubes 15 and 16 of one section are connected at their lower ends to a block 18 while the tubes 16 and 17 of the other section are connected at their lower ends to a block 19 and these tubes are surrounded by suitable sleeves 20 and, if desired, a retaining band 20ª may encircle said sleeves, these separate sleeves being connected by screw threads to their respective blocks 18 and 19 as most clearly shown. The block 18 has an inclined passage 21 and into which the tube 15 leads. The block also has a central passage 22 into which the lower end of the pipe 16 fits and these passages 21 and 22 communicate with a central recess 23 produced in the bottom of the block 18. A nozzle 24 having an enlarged and beveled end 25 is connected to the block 18 by means of a gasket 26, this nozzle having a central bore 27 slightly enlarged at its upper end as shown at 28 and into which projects the injector tube 29 arranged at the end of the oxygen pipe 16. 30 indicates a tip contracted in one direction and having an elongated slot or opening 30ª in the bottom thereof, and through which the commingled oxygen and hydrogen or other combustible gas issues and produces a thin elongated preheating flame. The block 19 has an inclined passage 31 which communicates with the acetylene gas tube 17 and it also has a central bore 32 with which the other oxygen tube 16 communicates. The bottom of this block 19 is recessed as shown at 33, this recess having communication with the passages 31 and 32. A combined nozzle and tip 34 having an enlarged and beveled head 35 is connected to the block 19 by means of the gasket 36 and the lower end of this combined nozzle and tip is not only contracted but it is also curved as shown at 37 and the extreme end thereof is projected adjacent to the end of the tip 30 but slightly below the same. This combined nozzle and tip is intended to deliver the commingled oxygen and acetylene gases for producing the welding flame and this flame is projected in the proper direction in the form of a fine jet which meets or nearly meets the thin elongated preheating flame of the combined oxygen and hydrogen gases.

In Fig. 4 I have shown a slightly modified form of tip 40 having an elongated slot or opening 41 in the bottom thereof and which extends nearly the entire width of the tip. At one side, said tip is formed with a downwardly extending portion 42 having a single opening 43 in the bottom thereof and at one side a connection 44 is provided for the attachment of a nozzle or tube leading the commingled oxygen and acetylene to this extended portion of the tip, the object of this combination tip being to provide in one device the two separate devices of the construction shown in Fig. 1, the operation being exactly the same in both cases.

By means of the blow pipe constructed as herein shown and described, it is obvious that I eliminate the objections of the blow pipes now in use in which separate and independent preheating jets are employed and which jets are spaced apart a sufficient distance to permit the influx of air. It will also be seen that by means of my improved blow pipe I am able to economize in the use of acetylene and can employ the hydrogen from an electrolytic device, and which has heretofore been discarded, or I may employ natural or any other combustible gas in connection with oxygen to provide the preheating flame thereby economizing in the use of acetylene.

While I have specified acetylene as the gas best adapted for commingling with oxygen to produce a welding flame it will be understood that I do not limit myself to this particular gas but may use any suitable combustible gas which will combine with oxygen and produce an efficient welding flame.

Having thus described my invention, what I claim is:—

1. In a blow pipe for welding machines, the combination with a tip having an elongated slot in the bottom thereof, a nozzle to which said tip is attached, means for supplying oxygen and a combustible gas to said nozzle and tip, and a second tip adapted to receive oxygen and acetylene and having its discharge end adjacent to the end of the first mentioned tip and projecting slightly below the same.

2. In a blow pipe for welding machines, the combination with a tip having an elongated slot in the bottom thereof, a nozzle to which said tip is connected, and means for supplying commingled oxygen and a combustible gas to said nozzle and tip, a second tip adapted to receive commingled oxygen and acetylene gases, the discharge end of said tip being arranged adjacent to the first named tip and projecting at an angle thereto.

3. In a blow pipe for welding machines the combination with a tip having an elongated slot in the bottom thereof and adapted to receive commingled oxygen and a combustible gas, of a second tip adapted to receive commingled oxygen and acetylene gases, the discharge end of said second tip being arranged adjacent to one end of said first named tip and projected at an angle thereto and extending slightly below the lower end of said first named tip.

4. In a blow pipe for welding machines, the combination of two separate tips, one of said tips having an elongated slot in the bottom thereof and adapted to receive commingled oxygen and a combustible gas, the second tip having a contracted discharge end, said discharge end being projected toward and adjacent to the end of the first named tip, the discharge end extending slightly below the lower end of the first named tip.

5. In a blow pipe for welding machines, the combination of a valve casing having oxygen and acetylene gas supply pipes leading thereinto and also a gas pipe adapted to convey a combustible gas other than acetylene, tubes leading from said valve casing and conveying said gases, valves for controlling the flow of gas through the casing, blocks to which the tubes are connected, each block having a recess, the recess in one block receiving commingled oxygen and a combustible gas, the recess in the other block receiving commingled oxygen and acetylene, a nozzle connected to each block and conveying the commingled gases to a tip at the end thereof.

6. In a blow pipe of the kind described the combination with a tip having an elongated slot in the bottom thereof and adapted to receive commingled oxygen and a combustible gas to produce a preheating flame, of a second tip adapted to receive commingled oxygen and a suitable combustible gas, the discharge end of said second tip being arranged adjacent to one end of said first named tip.

7. In a blow pipe of the kind described the combination with a tip having an elongated slot in the bottom thereof and adapted to receive commingled oxygen and a combustible gas to produce a preheating flame, of a second tip adapted to receive commingled oxygen and a suitable combustible gas, the discharge end of said second tip being arranged adjacent to one end of said first named tip and projected at an angle thereto and extending slightly below the lower end of said first named tip.

In testimony whereof, I hereunto affix my signature.

JOHN HARRIS.